United States Patent
Wakita (10) Patent No.: US 6,341,600 B1
(45) Date of Patent: Jan. 29, 2002

(54) MECHANISM FOR ADJUSTING ROTATIONAL BALANCE OF CUTTING MACHINE

(75) Inventor: Nobuhiko Wakita, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 09/637,004

(22) Filed: Aug. 14, 2000

(30) Foreign Application Priority Data

Aug. 20, 1999 (JP) .......................................... 11-233481

(51) Int. Cl.⁷ ................................................. B28D 1/04
(52) U.S. Cl. .................................... 125/13.01; 451/343
(58) Field of Search ............................... 125/13.01, 14, 125/15; 451/342, 343; 74/573 R (56) References Cited

U.S. PATENT DOCUMENTS 5,074,723 A * 12/1991 Massa et al. ............... 409/131
5,746,647 A * 5/1998 Huang ......................... 451/343
5,778,751 A * 7/1998 Tsuchishima et al. ......... 83/666
6,216,682 B1 * 4/2001 Nambu et al. ........... 125/13.01

* cited by examiner

*Primary Examiner*—Timothy V. Eley
*Assistant Examiner*—Dung Van Nguyen
(74) *Attorney, Agent, or Firm*—Smith, Gambrell & Russell, LLP (57) ABSTRACT

A mechanism for adjusting a rotational balance of a cutting machine, which comprises a spindle unit having a rotary spindle, a securing flange mounted on an end of the rotary spindle and having a tool-mounting portion along the outer periphery thereof, an annular cutting tool having a mounting hole that fits to the tool-mounting portion of the securing flange, and a holding flange for holding the cutting tool in cooperation with the securing flange, wherein at least two threaded holes are formed in the outer periphery of the holding flange or the securing flange in the radial direction, and balance weight screws each are screwed into the threaded holes so as to be moved forward or back.

3 Claims, 7 Drawing Sheets

MECHANISM FOR ADJUSTING ROTATIONAL BALANCE OF CUTTING MACHINE

FIELD OF THE INVENTION

The present invention relates to an improvement in a mechanism for adjusting a rotational balance of a precision cutting machine such as dicing machine (dicer).

DESCRIPTION OF THE PRIOR ART

In the production of semiconductor devices, for example, a surface of a semiconductor wafer of nearly a disk shape is sectioned into a plurality of rectangular sections by cutting lines called streets that are arranged in a lattice pattern, and predetermined circuit patterns are formed on the rectangular sections. The plurality of rectangular sections to which the circuit patterns are given are cut and separated individually to form so-called semiconductor chips. The semiconductor wafer is usually cut by a precision cutting machine called dicing machine.

The above cutting machine comprises a spindle unit having a rotary spindle, a securing flange mounted on an end of the rotary spindle and having a tool-mounting portion along the outer periphery thereof, an annular cutting tool having a mounting hole that fits to the tool-mounting portion of the securing flange, and a holding flange for holding the cutting tool in cooperation with the securing flange, and the cutting tool rotating at a high speed (e.g., 60,000 rpm) cuts a workpiece. In cutting the semiconductor wafer, in particular, a grinder blade constituting a cutting tool having a thickness of about 15 $\mu$m is required to be positioned on the cutting line having a width of about 50 $\mu$m formed on the semiconductor wafer to effect the cutting with high precision. For this purpose, vibration of the blade must be avoided.

To facilitate the attachment or detachment of the cutting tool mounted on the rotary spindle, a small clearance of about several microns must be provided between the mounting hole of the blade and the tool-mounting portion of the securing flange attached to the rotary spindle. When the cutting tool is mounted in a state of the center of rotation of the rotary spindle not being in agreement with the center of rotation of the cutting tool, therefore, the rotational balance is not attained and hence, vibration occurs as the rotary spindle and the blade rotate at high speeds. Vibration produces a lot of pitching on both sides of the cutting groove cut by the grinder blade that constitutes the cutting tool, making it difficult to accomplish the cutting with high precision. The same problem occurs even when the rotational balance of the cutting tool itself is not maintained.

Figure 11:
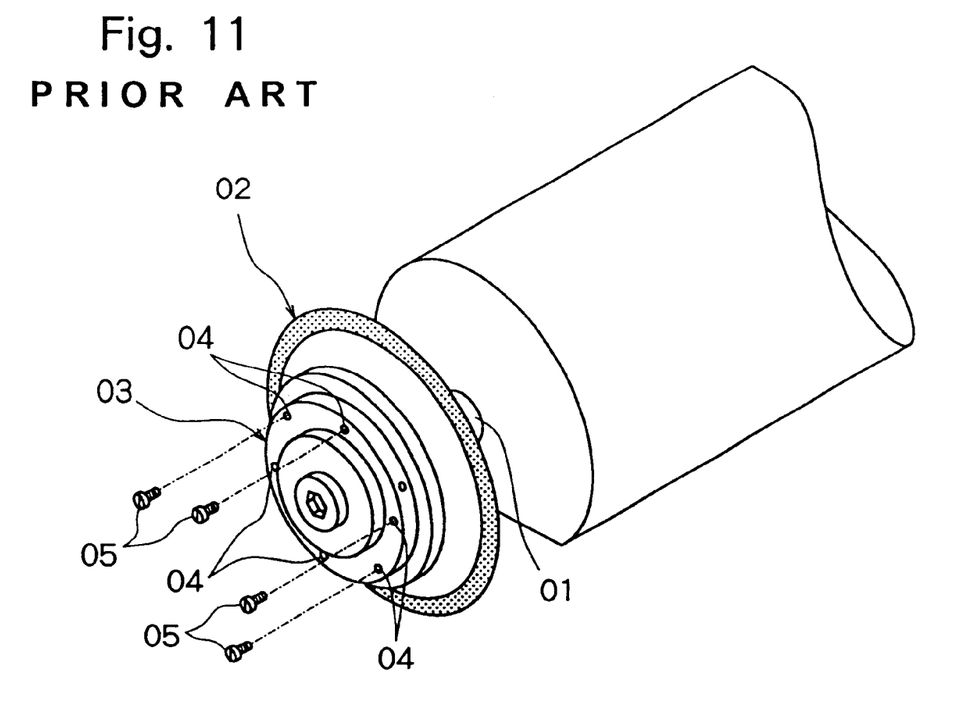
FIG. 11 is a perspective view illustrating, in a disassembled manner, a conventional mechanism for adjusting the rotational balance of the cutting machine.

In order to solve the above-mentioned problem, the cutting machine is equipped with a mechanism for adjusting the rotational balance to adjust the rotational balance after the cutting tool is mounted on the rotary spindle. According to a conventional mechanism for adjusting the rotational balance as shown in FIG. 11, a holding flange 03 holding a cutting tool 02 in cooperation with a securing flange (not shown) attached to an end of a rotary spindle 01 is provided with a plurality of threaded holes 04 at even intervals in the axial direction for mounting a weight for adjusting the balance and then, after the cutting tool 02 is mounted on the rotary spindle 01, plural kinds of balance weight screws 05 having different weights are screwed into the plural threaded holes 04 to adjust the rotational balance.

In the above-mentioned conventional mechanism for adjusting the rotational balance, however, plural kinds of balance weight screws 05 having different weights must be prepared for precisely adjusting the rotational balance. Besides, the threaded holes 04 and the balance weight screws 05 are so small that they require cumbersome handling, and a considerable degree of skill is required for adjusting the balance.

SUMMARY OF THE INVENTION

It is an object of the present invention to provide a mechanism for adjusting a rotational balance of a cutting machine, which can facilitate the precise adjustment of balance without the need of preparations of plural kinds of balance weight screws.

In order to accomplish the above-mentioned object according to the present invention, there is provided a mechanism for adjusting a rotational balance of a cutting machine, which comprises a spindle unit having a rotary spindle, a securing flange mounted on an end of the rotary spindle and having a tool-mounting portion along the outer periphery thereof, an annular cutting tool having a mounting hole that fits to the tool-mounting portion of the securing flange, and a holding flange for holding the cutting tool in cooperation with the securing flange, wherein:

at least two threaded holes are formed in the outer periphery of the holding flange in the radial direction, and balance weight screws are screwed into the threaded holes; and the balance weight screws are suitably moved forward or moved back along the threaded holes in the radial direction to adjust the rotational balance of the spindle unit.

According to the present invention, furthermore, there is provided a mechanism for adjusting a rotational balance of a cutting machine, which comprises a spindle unit having a rotary spindle, a securing flange mounted on an end of the rotary spindle and having a tool-mounting portion along the outer periphery thereof, an annular cutting tool having a mounting hole that fits to the tool-mounting portion of the securing flange, and a holding flange for holding the cutting tool in cooperation with the securing flange, wherein:

at least two threaded holes are formed in the outer periphery of the securing flange in the radial direction, and balance weight screws are screwed into the threaded holes; and the balance weight screws are suitably moved forward or moved back along the threaded holes in the radial direction to adjust the rotational balance of the spindle unit.

DETAILED DESCRIPTION OF THE PREFERRED EMBODIMENTS

Embodiments of the mechanism for adjusting a rotational balance of a cutting machine constituted according to the present invention will now be described in detail with reference to the accompanying drawings.

Figure 1:
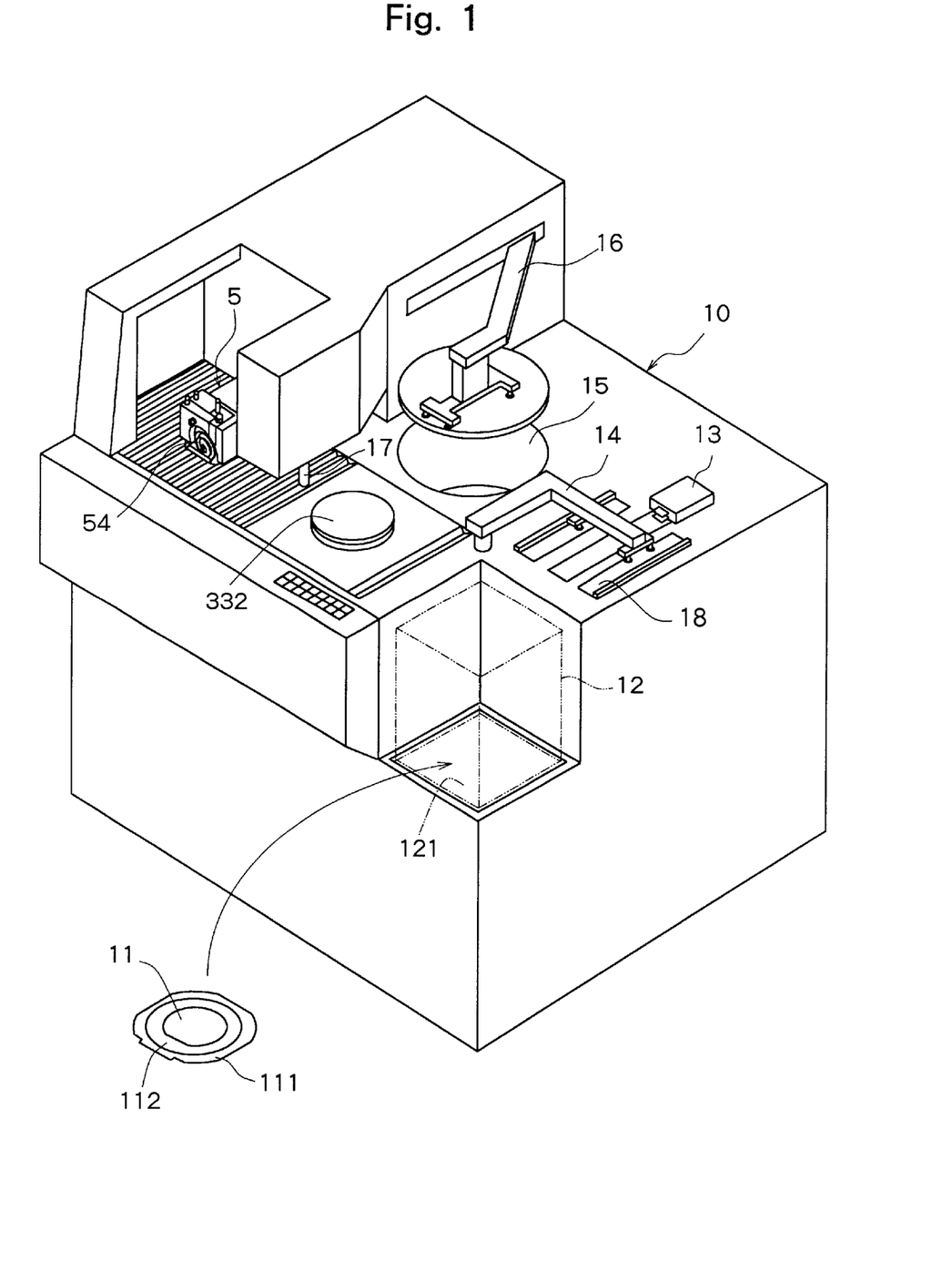
FIG. 1 is a perspective view of a dicing machine which is a cutting machine equipped with a mechanism for adjusting the rotational balance constituted according to the present invention.

FIG. 1 is a perspective view illustrating a dicing machine, which is a cutting machine, equipped with a mechanism for adjusting the rotational balance constituted according to the present invention.

The dicing machine shown in FIG. 1 is equipped with a machine housing 10 which is nearly of a rectangular parallelepiped shape. In the machine housing 10 are disposed a stationary base plate 2, a chuck table mechanism 3 which is disposed on the stationary base plate 2 to move in a direction indicated by an arrow X that is the moving direction and holds the workpiece, a spindle support mechanism 4 which is disposed on the stationary base plate 2 to move in the direction indicated by an arrow Y (direction perpendicular to the moving direction indicated by the arrow X) which is the indexing direction, and a spindle unit 5 which is disposed on the spindle support mechanism 4 to move in a direction indicated by an arrow Z which is the cutting direction.

Figure 2:
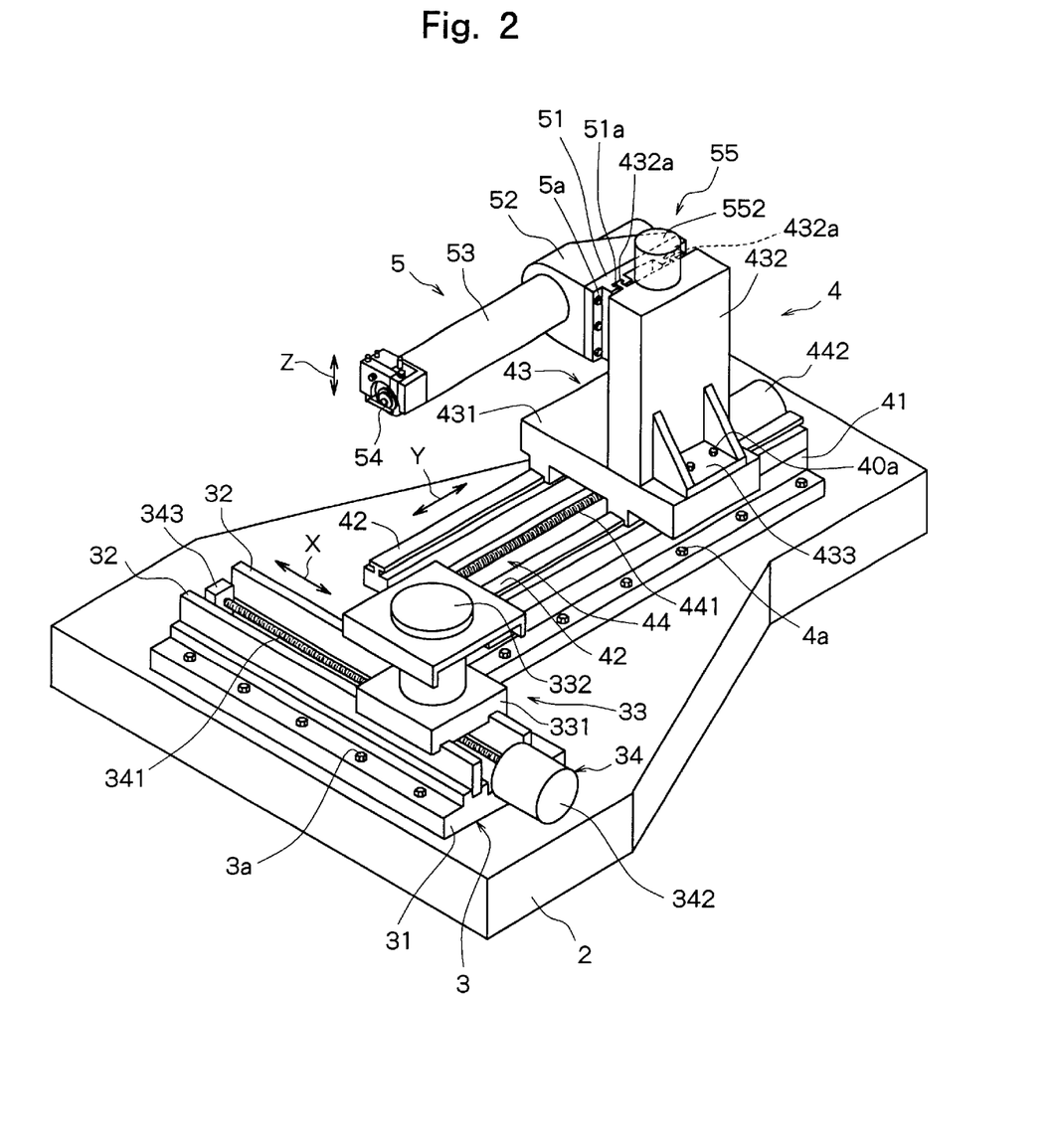
FIG. 2 is a perspective view illustrating major portions of the dicing machine shown in FIG. 1.

The chuck table mechanism 3 includes a support plate 31 disposed and secured onto the stationary base plate 2 by using plural mounting bolts 3a, two guide rails 32 and 32 arranged in parallel on the support plate 31 in the direction indicted by the arrow X, and a chuck table 33 arranged on the guide rails 32 and 32 to move in the direction indicated by the arrow X. The chuck table 33 includes an adsorption chuck support plate 331 movably arranged on the guide rails 32 and 32, and an adsorption chuck 332 mounted on the adsorption chuck support plate 331. A disk-like semiconductor wafer that is a workpiece is held on the adsorption chuck 332 by a suction means that is not shown. Further, the chuck table mechanism 3 includes a drive means 34 for moving the chuck table 33 in the direction of the arrow X along the two guide rails 32 and 32. The drive means 34 includes an externally threaded rod 341 arranged between the two guide rails 32 and 32 in parallel therewith, and a drive source such as pulse motor 342 for rotatively driving the externally threaded rod 341. The externally threaded rod 341 is rotatably supported at its one end by a bearing block 343 secured to the support plate 31, and is transmission-coupled, at its other end, to the output shaft of the pulse motor 342 through a reduction device that is not shown. The externally threaded rod 341 is screwed into an internally threaded through-hole formed in an internally threaded block (not shown) protruding from the lower surface at the center of the adsorption chuck support plate 331 that constitutes the chuck table 33. By driving the externally threaded rod 341 forward or reverse by the pulse motor 342, therefore, the chuck table 33 is moved along the guide rails 32 and 32 in the direction of the arrow X.

The spindle support mechanism 4 includes a support plate 41 disposed and secured onto the stationary base plate 2 using plural mounting bolts 4a, two guide rails 42 and 42 arranged in parallel on the support plate 41 along the direction of the arrow Y, and a movable support plate 43 disposed on the guide rails 42 and 42 to move in the direction of the arrow Y. The movable support plate 43 includes a moving support portion 431 movably disposed on the guide rails 42 and 42, and a spindle-mounting portion 432 mounted on the moving support portion 431. A mounting bracket 433 is secured to the spindle-mounting portion 432. By fastening the mounting bracket 433 to the moving support portion 431 by using plural mounting bolts 40a, the spindle-mounting portion 432 is mounted on the moving support portion 431. Further, the spindle-mounting portion 432 has two guide rails 432a and 432a extending in the direction indicated by the arrow Z on the surface of the side opposite to the surface side on which the mounting bracket 433 is mounted. The spindle support mechanism 4 includes a drive means 44 for moving the movable support plate 43 in the direction of the arrow Y along the two guide rails 42 and 42. The drive means 44 includes an externally threaded rod 441 arranged between the two guide rails 42 and 42 in parallel therewith, and a drive source such as pulse motor 442 for driving the externally threaded rod 441. The externally threaded rod 441 is rotatably supported at its one end by a bearing block (not shown) secured to the support plate 41 and is transmission-coupled, at its other end, to the output shaft of the pulse motor 442 through a reduction gear that is not shown. The externally threaded rod 441 is screwed into an internally threaded through hole formed in an internally threaded block (not shown) protruding from the lower surface at the central portion of the moving support portion 431 constituting the movable support plate 43. By driving the externally threaded rod 441 forward and reverse by the pulse motor 442, therefore, the movable support plate 43 is moved in the direction indicated by the arrow Y along the guide rail 42 and 42.

The spindle unit 5 includes a moving base plate 51, a spindle holder 52 secured to the moving base plate 51 using plural mounting bolts 5a, and a spindle housing 53 mounted on the spindle holder 52. The moving base plate 51 is provided with two to-be-guided rails 51a and 51a that slidably fit to the two guide rails 432a and 432a provided for the spindle-mounting portion 432 of the spindle support mechanism 4. Upon fitting the to-be-guided rails 51a, 51a to the guide rails 432a, 432a, the moving base plate 51 is supported to move in the direction indicated by the arrow Z. A cutting tool 54 is rotatably attached to an end of the spindle housing 53. A rotary drive mechanism (not shown) for rotating the cutting tool 54 is disposed in the spindle housing 53. The rotary spindle constituting the rotary drive mechanism, the cutting tool 54 and their mounting structures will be described later in detail. The spindle unit 5 includes a drive means 55 for moving the moving base plate 51 in the direction of the arrow Z along the guide rails 432a and 432a. The drive means 55 includes an externally threaded rod (not shown) arranged between the guide rails 432a and 432a, and a drive source such as pulse motor 552 for rotatively driving the externally threaded rod like the above-mentioned drive means 34 and 44. By driving the externally threaded rod (not shown) forward and reverse by the pulse motor 552, the spindle unit 5 is moved in the direction indicated by the arrow Z along the guide rails 432a and 432a.

Referring to FIG. 1, the illustrated dicing machine includes a cassette 12 for stocking semiconductor wafers 11 that are workpieces, a workpiece delivery means 13, a workpiece conveying means 14, a washing means 15, a conveying means 16, and an aligning means 17 constituted by a microscope, a CCD camera, etc. The semiconductor wafer 11 is mounted on a frame 111 using a tape 112, and is accommodated in the cassette 12 in a state of being mounted on the frame 111. The cassette 12 is placed on a cassette table 121 that is disposed so as to move up and down by an ascending/descending means that is not shown.

Next, the processing action of the dicing machine will be briefly described.

The semiconductor wafer 11 in a state of being mounted on the frame 111 accommodated in the cassette 12 at a predetermined position (hereinafter, the semiconductor wafer 11 in a state of being mounted on the frame 111 is simply referred to as semiconductor wafer 11), is brought to a delivery position as the cassette table 121 is moved up and down by an ascending/descending means that is not shown. Then, the workpiece delivery means 13 moves back and forth to deliver the semiconductor wafer 11 located at the delivery position to the workpiece placing area 18. The semiconductor wafer 11 delivered to the workpiece placing area 18 is conveyed onto the absorption chuck 332 of the chuck table 33 constituting the chuck table mechanism 3 by turning action of the workpiece conveying means 14, and is sucked and held by the suction chuck 332. The chuck table 33 that has held the semiconductor wafer 11 by suction is then moved to just under the aligning means 17 along the guide rails 32 and 32. When the chuck table 33 is brought to just under the aligning means 17, a cutting line formed on the semiconductor wafer 11 is detected by the aligning means 17, and a precise positioning operation is executed. Thereafter, the chuck table 33 holding the semiconductor wafer 11 by suction is moved in the direction of the arrow X which is the moving direction, whereby the semiconductor wafer 11 held by the chuck table 33 is cut by the cutting tool 54 along a predetermined cutting line. That is, the cutting tool 54 is mounted on the spindle unit 5 that is positioned by being moved, while adjusted, in the direction of the arrow Y that is the indexing direction and in the direction of the arrow Z that is the cutting direction, and is rotatively driven. By moving the chuck table 33 in the moving direction along the lower side of the cutting tool 54, therefore, the semiconductor wafer 11 held by the chuck table 33 is cut by the cutting tool 54 along a predetermined cutting line, and is divided into semiconductor chips. The semiconductor chips that have been cut do not scatter into pieces due to the action of the tape 112 but remain in the state of the semiconductor wafer 11 mounted on the frame 111. After the semiconductor wafer 11 have been cut as described above, the chuck table 33 holding the semiconductor wafer 11 is returned back to the position where the semiconductor wafer 11 has been first held by suction and the holding by suction of the semiconductor wafer 11 is released. Next, the semiconductor wafer 11 is conveyed by the conveying means 16 to the washing means 15 and is washed. The thus washed semiconductor wafer 11 is delivered by the workpiece conveying means 14 onto the workpiece placing area 18. The semiconductor wafer 11 is then accommodated at a predetermined position in the cassette 12 by the workpiece delivery means 13.

Next, the rotary spindle constituting the spindle unit 5, the cutting tool 54 and their mounting structures will be described with reference to FIGS. 3 to 5.

Figure 3:
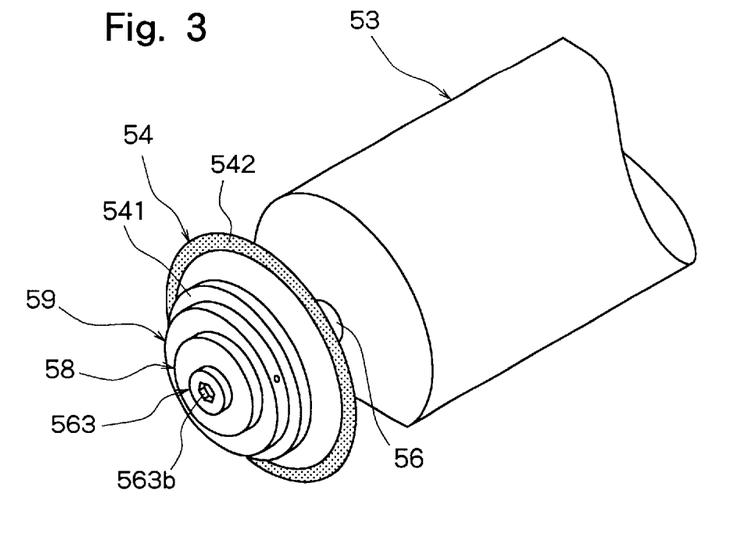
FIG. 3 is a perspective view illustrating major portions of a spindle unit constituting the dicing machine shown in FIG. 2.
Figure 4:
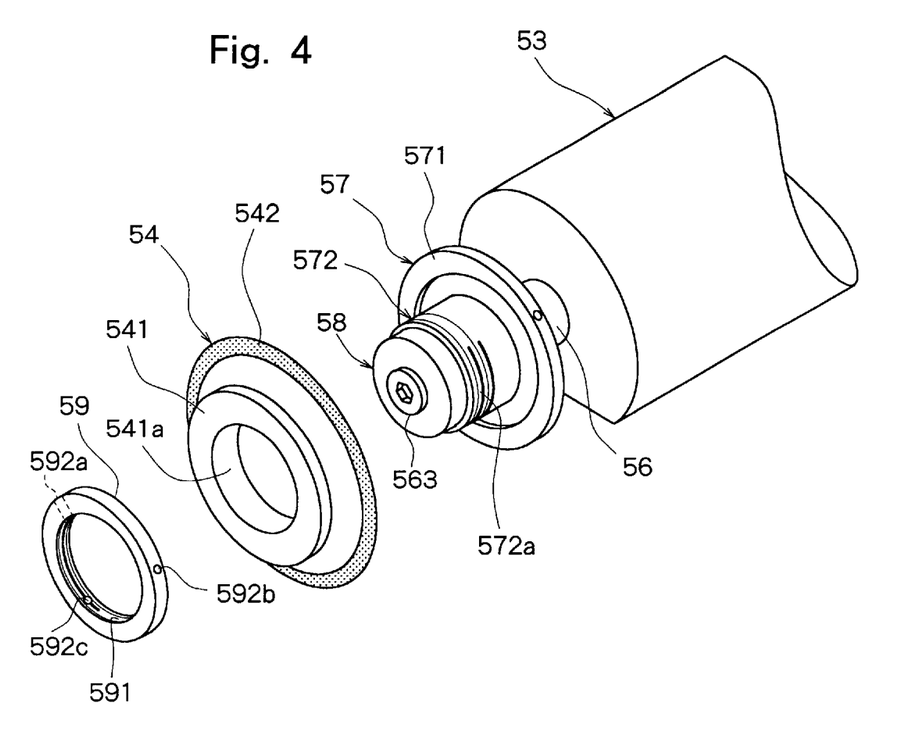
FIG. 4 is a perspective view illustrating, in a disassembled manner, a securing flange, a cutting tool and a holding flange attached, by using fastening nuts, to a rotary spindle to constitute a spindle unit shown in FIG. 3.
Figure 5:
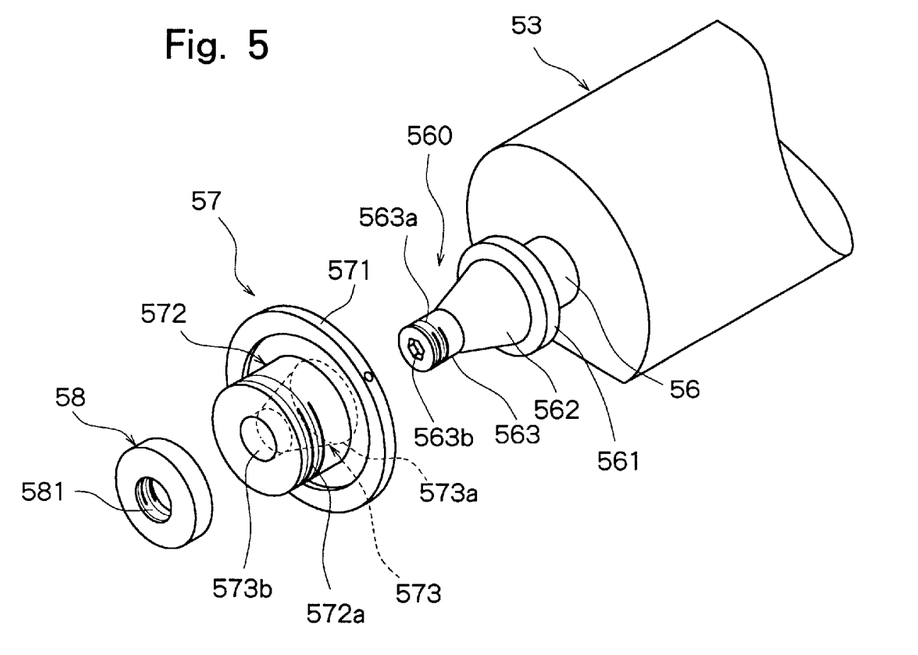
FIG. 5 is a perspective view illustrating, in a disassembled manner, the securing flange and the fastening nuts attached to the rotary spindle to constitute the spindle unit shown in FIG. 3.

FIG. 3 is a perspective view illustrating the cutting tool 54 mounted on the rotary spindle 56, FIG. 4 illustrates, in a disassembled manner, the securing flange 57 attached to the rotary spindle 56 by using a fastening nut 58, the cutting tool 54 and the holding flange 59, and FIG. 5 illustrates, in a disassembled manner, the securing flange 57 and the fastening nut 58 to be mounted on the rotary spindle 56.

Referring to FIG. 5, the illustrated rotary spindle 56 has, at its end, a mounting portion 560 for mounting the securing flange 57 that will be described later. The mounting portion 560 includes a flange portion 561, a tapered portion 562 and a cylindrical fastening portion 563. The outer peripheral surface of the end of the fastening portion 563 is externally threaded as designated at 563a, and a tool-fitting recessed portion 563b is formed, in an end surface, for being fitted with a turn-stop tool. The securing flange 57 is mounted on the thus constituted mounting portion 560.

The securing flange 57 includes a flange portion 571 and a tool-mounting portion 572. The tool-mounting portion 572 is formed in a cylindrical shape and its outer peripheral surface at an end has an externally threaded portion 572a. Further, a fitting hole 573 is formed at the central portion of the securing flange 57 penetrating through in the axial direction. The fitting hole 573 comprises a tapered hole portion 573a corresponding to the outer peripheral surface of the tapered portion 562 of the mounting portion 560 and a cylindrical hole portion 573b corresponding to the outer peripheral surface of the fastening portion 563 of the mounting portion 560. The thus constituted securing flange 57 is mounted on the mounting portion 560 of the rotary spindle 56 as shown in FIG. 4 by fitting its tapered hole portion 573a of the fitting hole 573 to the tapered portion 562 of the mounting portion 560, fitting its cylindrical hole portion 573b to the fastening portion 563 of the mounting portion 560 and then, screwing its internal screw 581 of the fastening nut 58 to the external thread 563a formed in the fastening portion 563 of the mounting portion 560.

The cutting tool 54 is mounted on the securing flange 57 attached to the mounting portion 560 of the rotary spindle 56. The cutting tool 54 comprises a blade support member 541 and an annular grinder blade 542 provided along the outer circumference of the blade support member 541. The blade support member 541 has, at its central portion, a mounting hole 541a a size of which is larger by about several microns than the outer size of the tool-mounting portion 572 of the securing flange 57. By fitting the mounting hole 541a of the blade support member 541 to the tool-mounting portion 572 of the securing flange 57 and then, screwing its internal screw 591 formed in the holding flange 59 onto the threaded portion 572a formed on the tool-mounting portion 572, the thus constituted cutting tool 54 is mounted being sandwiched between the flange portion 571 of the securing flange 57 and the holding flange 59 to hold it, as shown in FIG. 3.

In the illustrated embodiment, the holding flange 59 is provided with a mechanism for adjusting the rotational balance constituted according to the present invention. An embodiment of the mechanism for adjusting the rotational balance will be described below with reference to FIGS. 6 and 7.

The holding flange 59 in the illustrated embodiment is formed of aluminum in an annular shape and has three threaded holes 592a, 592b and 592c formed in the outer periphery thereof in the radial direction. The three threaded holes 592a, 592b and 592c are arranged at an equal distance of a phase angle of 120 degrees relative to each other. Balance weight screws 60 each are screwed into the three threaded holes 592a, 592b and 592c formed in the holding flange 59. The balance weight screws 60 are externally threaded as designated at 61 so as to be screwed into the threaded holes 592a, 592b and 592c, and have an engaging groove 62 formed in one end surface thereof so as to be engaged with a screw driver. It is desired that the balance weight screws 60 are made of a metal having a large specific gravity, such as stainless steel, tungsten or copper or an alloy thereof. The thus constituted balance weight screws 60 each are screwed into the three threaded holes 592a, 592b and 592c formed in the holding flange 59. The balance weight screws 60 screwed into the threaded holes 592a, 592b and 592c can be moved forward or back in the radial direction along the threaded holes 592a, 592b and 592c by engaging the screw driver with the engaging groove 62 and turning it clockwise or counterclockwise, in order to change their distances from the center of rotation in the radial direction. The centrifugal force of the balance weight screw 60 varies in proportion to the distance from the center of rotation in the radial direction. Therefore, the rotational balance can be adjusted by adjusting the positions of the balance weight screws 60 in the radial direction. In the embodiment shown in FIGS. 6 and 7 as described above, the balance weight screws 60 are screwed into the three threaded holes 592a, 592b and 592c formed in the holding flange 59, and the rotational balance is adjusted by moving the balance weight screws 60 forward or moving them back along the threaded holes 592a, 592b and 592c in the axial direction. Therefore, even by use of only one kind of the balance weight screws 60, it is allowed to accomplish accurate adjustment with very ease. It is important that the balance weight screws 60 be kept at their adjusted positions. For this purpose, it is desired to use the balance weight screws 60 with their externally threaded portions 61 being melt-adhered with a synthetic resin such as nylon, so that they exhibit an increased anti-loosening function.

Next, another embodiment of the mechanism for adjusting the rotational balance will be described with reference to FIG. 8.

Figure 7:
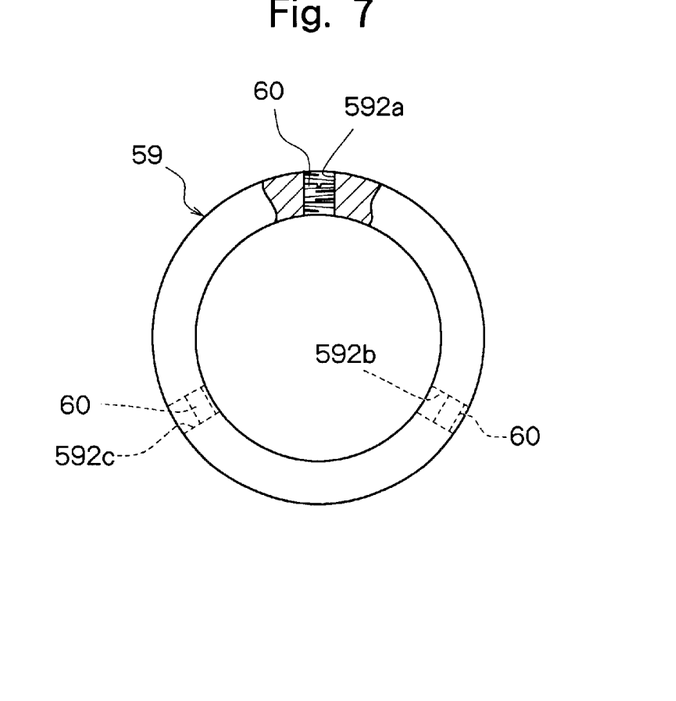
FIG. 7 is a front view illustrating, partly in a cut-away manner, the holding flange provided with the mechanism for adjusting the rotational balance shown in FIG. 5.
Figure 8:
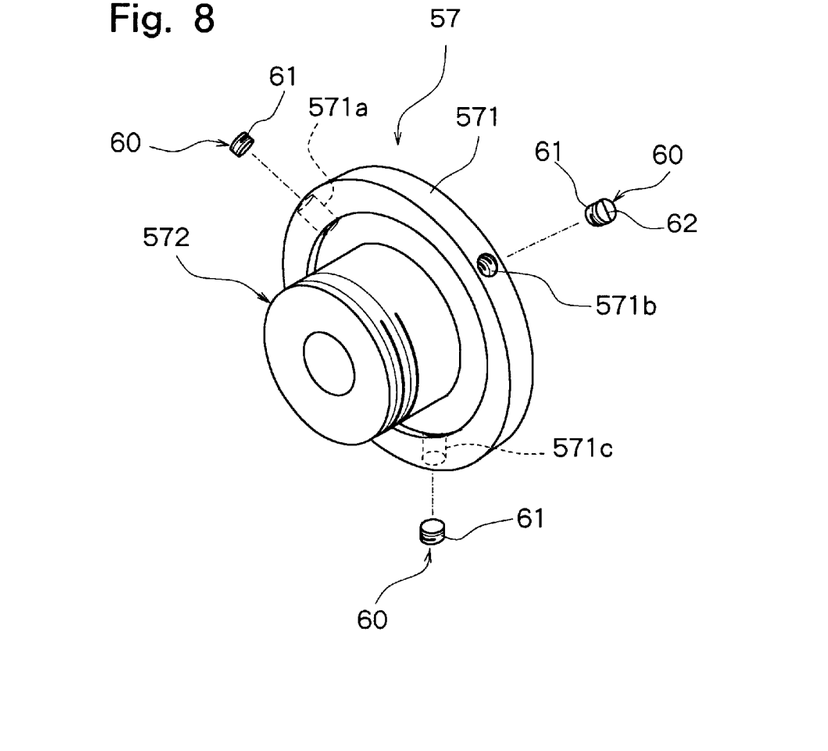
FIG. 8 is a perspective view illustrating, in a disassembled manner, another embodiment of the mechanism for adjusting the rotational balance constituted according to the present invention.

In the mechanism for adjusting the rotational balance of the embodiment shown in FIG. 8, three threaded holes 571a, 571b and 571c are formed in the outer periphery of the flange portion 571 of the securing flange 57 at an equal distance of a phase angle of 120 degrees relative to one other in the radial direction, and the above-mentioned balance weight screws 60 each are screwed into the three threaded holes 571a, 571b and 571c. In the embodiment shown in FIG. 8, too, therefore, the balance weight screws 60 are moved forward or moved back along the threaded holes 571a, 571b, 571c in the radial direction to adjust the rotational balance and to obtain the same action and effect as those of the embodiment shown in FIGS. 6 and 7.

Figure 6:
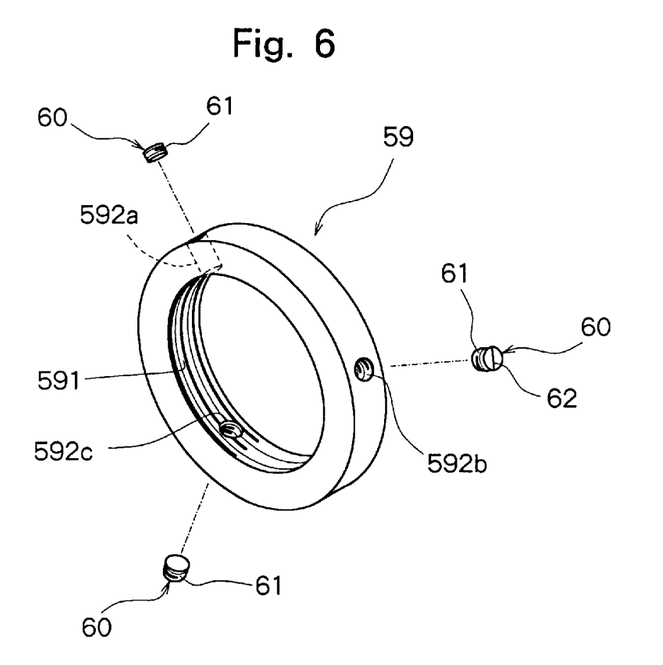
FIG. 6 is a disassembled perspective view illustrating an embodiment of a mechanism for adjusting the rotational balance constituted according to the present invention.

In the embodiments shown in FIGS. 6, 7 and 8, the three threaded holes 592a, 592b, 592c and 571a, 571b, 571c are formed in the outer periphery of the flange portion 571 of the holding flange 59 and of the securing flange 57 at an equal distance of a phase angle of 120 degrees relative to each other, and the balance weight screws 60 and 60 each are screwed into the three threaded holes 592a, 592b, 592c and 571a, 571b, 571c. However, at least two threaded holes are enough to be formed in the flange and their phase angles need not be selected to be equal to each other. When the threaded holes are formed in a number of two, it is important that the two threaded holes be formed at a phase angle other than 180 degrees.

Next, described below is how to adjust the rotational balance by the mechanism for adjusting the rotational balance according to the embodiment shown in FIGS. 6 and 7.

To adjust the rotational balance of the spindle unit which is a rotary member, it is necessary to detect the unbalance position of the spindle unit which is the rotary member. As a device for detecting the unbalance position of the rotary member, there can be used, for example, "PROGRAM AUTO BALANCER (MYSELF-1)" (trade name) manufactured by OHMIYA KOGYO Co., Ltd. located at 60-banchi, 5-chome, Daimon-cho, Fukuyama-shi, Hiroshima-ken, Japan.

Figure 9:
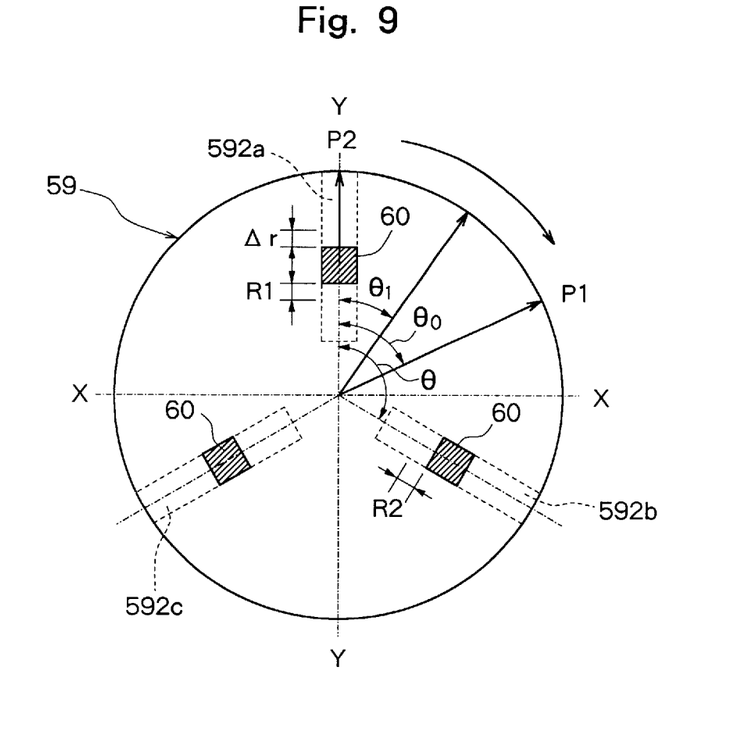
FIG. 9 is a view illustrating how to adjust unbalance by using the mechanism for adjusting the rotational balance constituted according to the present invention.

When the unbalance in the spindle unit which is the rotary member is detected by using the above unbalance detector, the display means of the unbalance detector shows, as shown in FIG. 9, the presence of unbalance at an unbalance position of an angle $\theta_0$ (unbalance angle) in the rotational direction indicated by an arrow based on, for example, a threaded hole 592a as a reference, which is one of the threaded holes 592 formed in the holding flange 59.

When the unbalance position is detected based on the threaded hole 592a as a reference formed in the holding flange 59 as described above, the balance weight screws 60 screwed into the threaded holes 592a, 592b, 592c are moved forward or back to correct unbalance. Described below is one example for how to effect the correction.

In FIG. 9, a centrifugal force P1 at the unbalance position of an angle $\theta_0$ from the reference threaded hole 592a, is expressed by the following formula (1), $$P1 = m_0 \cdot r_0 \cdot \omega^2 \tag{1}$$

where $m_0$ is an unbalance mass, $r_0$ is a radius where the unbalance mass exists, and $\omega$ is an angular velocity.

Next, the balance weight screw 60 screwed into the reference threaded hole 592a is moved by $\Delta r$ in the radial direction, for example, in the circumferential direction and then, the unbalance in the spindle unit which is the rotary member is detected by using the unbalance detector in the same manner as described above. In this case, since the balance weight screw 60 is moved by $\Delta r$ in the circumferential direction, the unbalance position displaces to a position of an angle $\theta_1$ from the reference threaded hole 592a in a range of the angle $\theta_0$.

Here, a centrifugal force P2 at a position of the reference threaded hole 592a that has increased as a result of moving by $\Delta r$ the balance weight screw 60 in the reference threaded hole 592a in the circumferential direction, is expressed by the following formula (2), $$P2 = m \cdot \Delta r \cdot \omega^2 \tag{2}$$

where m is a mass of the balance weight screw 60.

From the unbalance angles $\theta_0$ and $\theta_1$ and the formulas (1) and (2), there is obtained the following formula (3) for finding the unbalance amount of the spindle unit which is the rotary member, $$P2 \cdot \sin \theta_1 = P1 \cdot \sin(\theta_0 - \theta_1)$$

$$m \cdot \Delta r \cdot \omega^2 \cdot \sin \theta_1 = m_0 \cdot r_0 \cdot \omega^2 \cdot \sin(\theta_0 - \theta_1)$$

$$m_0 \cdot r_0 = m \cdot \Delta r \cdot \omega^2 \cdot \sin \theta_1 / \omega^2 \cdot \sin(\theta_0 - \theta_1)$$

$$m_0 \cdot r_0 = m \cdot \Delta r \cdot \sin \omega_1 / \sin(\theta_0 - \theta_1) \tag{3}$$

The balance weight screws 60 screwed into the threaded holes 592a, 592b, 592c are moved and adjusted toward the center or toward the circumference so as to cancel the unbalance amount $(m_0 \cdot r_0)$ found according to the above formula (3), thereby to correct unbalance.

Described below are the amounts of movement of the balance weight screws 60 that are to be moved forward or back in the threaded holes 592a, 592b, 592c to correct unbalance.

The unbalance amount $(m_0 \cdot r_0)$ found according to the formula (3) acts at the unbalance position of an angle $\theta_0$ from the reference threaded hole 592a, and the component Xa of the unbalance amount $(m_0 \cdot r_0)$ in the direction of X-axis is expressed by the following formula (4), $$Xa = (m_0 \cdot r_0) \sin \theta_0 \tag{4}$$

The component Ya of the unbalance amount $(m_0 \cdot r_0)$ in the direction of Y-axis is expressed by the following formula (5), $$Ya = (m_0 \cdot r_0) \cos \theta_0 \tag{5}$$

To cancel the component Xa of the unbalance amount $(m_0 \cdot r_0)$ in the direction of X-axis, it is enough that the balance weight screw 60 in the threaded hole 592b or 592c, or in the threaded holes 592b and 592c be moved in the radial direction. Here, when the balance weight screw 60 in the threaded hole 592b is moved and its moving amount is taken to be R2, the moving amount R2 is expressed by the following formula (6), $$m \cdot R2 \cdot \sin \theta + (m_0 \cdot r_0) \sin \theta_0 = 0$$

$$R2 = -(m_0 \cdot r_0) \sin \theta_0 / (m \cdot \sin \theta)$$

$$R2 = -\Delta r \cdot \sin \theta_1 \cdot \sin \theta_0 / \{\sin(\theta_0 - \theta_1) \cdot \sin \theta\} \tag{6}$$

where $\theta$ is an angle between the threaded hole 592a and the threaded hole 592b, and is 120 degrees in the illustrated embodiment.

To cancel the component Ya of the unbalance amount (m0·r0) in the direction of Y-axis, the balance weight screw 60 in the threaded hole 592a may be moved in the radial direction. Here, when the balance weight screw 60 in the threaded hole 592a is taken to be R1, the moving amount R1 is expressed by the following formula (7), $$m \cdot R1 + (m_0 \cdot r_0) \cos \theta_0 + m \cdot R2 \cos \theta_0 = 0$$

$$R1 + \Delta r \cdot \sin \theta_1 \cdot \cos \theta_0 / \sin(\theta_0 - \theta_1) + R2 \cdot \cos \theta = 0$$

$$R1 = -\{\Delta r \cdot \sin \theta_1 \cdot \cos \theta_0 / \sin(\theta_0 - \theta_1) + \Delta r \cdot \sin \theta_1 \cdot \sin \theta_0 \cdot \cos \theta\} / \{\sin(\theta_0 - \theta_1) \cdot \sin \theta\}$$

$$R1 = -\Delta r \cdot \sin \theta_1 \{\cos \theta_0 \cdot \sin \theta + \sin \theta_0 \cdot \cos \theta\} / \{\sin(\theta_0 - \theta_1) \cdot \sin \theta\} \tag{7}$$

In the illustrated embodiment as described above, to correct the unbalance, the balance weight screw 60 in the threaded hole 592b is moved by an amount R2 toward the central direction (moved toward the center when the value that is found has a minus (−) and is moved toward the circumference when the value that is found has a plus (+)), and the balance weight screw 60 in the threaded hole 592a is moved from the initial position by an amount R1 toward the central direction (moved toward the center when the value that is found has a minus (−) and is moved toward the circumference when the value that is found has a plus (+)),. Thus, the unbalance can be corrected by moving the two balance weight screws 60.

Figure 10:
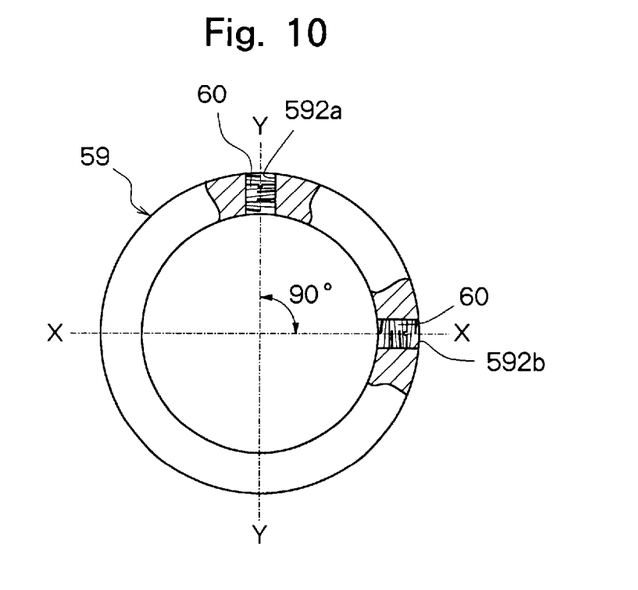
FIG. 10 is a front view illustrating, partly in a cut-away manner, a further embodiment of the mechanism for adjusting the rotational balance constituted according to the present invention.

Next, a further embodiment of the mechanism for adjusting the rotational balance will be described with reference to FIG. 10. The mechanism for adjusting the rotational balance according to the embodiment shown in FIG. 10 is the one in which the invention is adapted to the holding flange 59. Two threaded holes 592a and 592b are formed in the radial direction maintaining a phase angle of 90 degrees in the rotational direction indicated by an arrow. The balance weight screws 60 are screwed into the two threaded holes 592a and 592b. When the angle $\theta$ between the threaded holes 592a and 592b is set to 90 degrees as in the mechanism for adjusting the rotational balance shown in FIG. 10, $\sin \theta$ is 1 and $\cos \theta$ is 0. Therefore, the formula (6) for finding the moving amount R2 is given by the following formula (8), and this moving amount R2 is a moving amount that cancels only the component in the direction of X-axis.

$$R2 = -\Delta r \cdot \sin \theta_1 \cdot \sin \theta_0 / \sin(\theta_0 - \theta_1) \tag{8}$$

Further, the formula (7) for finding the moving amount R1 is given by the following formula (9), and this moving amount R1 is a moving amount that cancels only the component in the direction of Y-axis.

$$R1 = -\Delta r \cdot \sin \theta_0 \cdot \cos \theta_0 / \sin(\theta_0 - \theta_1) \tag{9}$$

In the foregoing was described the method of correcting the unbalance by moving forward or back the two balance weight screws 60. By storing the formulas 6 and 7 or the formulas 8 and 9 for finding the moving amounts R2 and R1 of the balance weight screws 60 in the memory of the unbalance detector in advance and by inputting $\Delta r$ and $\theta$, it is possible to display the moving amounts R2 and R1 on the display means of the unbalance detector. Then, the operator moves forward or back the balance weight screws 60 according to the displayed moving amounts R2 and R1 to easily correct the unbalance.

Though the invention was described above by way of the illustrated embodiments, it should be noted that the invention is in no way limited to the above embodiments only. In the illustrated embodiments, three threaded holes and two threaded holes were respectively formed in the holding flange 59 and in the securing flange 57. It is enough, however, that the threaded holes be formed in a number of at least two. When the threaded holes are formed in a number of two, the angle between the two threaded holes must be set at an angle other than 180 degrees. Here, a desired angle is 90 degrees.

Further, in the illustrated embodiments, the invention was applied to the dicing machine. Not being limited thereto only, however, the invention can be extensively applied to the cutting machines in addition to the dicing machine.

The mechanism for adjusting the rotational balance of the cutting machine according to the present invention exhibits actions and effects as described below.

That is, according to the present invention, at least two threaded holes are formed in the radial direction in the outer periphery of the holding flange that holds the cutting tool in cooperation with the securing flange, and the balance weight screws each are screwed into the threaded holes. Therefore, the rotational balance of the spindle unit is adjusted by suitably moving forward or back the balance weight screws along the threaded holes in the radial direction. Thus, precise adjustment is accomplished by using the balance weight screws of one kind. Besides, the adjusting operation is very easy and even an unskilled person can easily adjust the rotational balance.

According to the present invention, further, at least two threaded holes are formed in the radial direction in the outer periphery of the securing flange, the balance weight screws each are screwed into the threaded holes and are moved forward or back along the threaded holes in the radial direction to adjust the rotational balance of the spindle unit. Like in the aforesaid invention, therefore, precise adjustment is accomplished by using the balance weight screws of one kind. Besides, the adjusting operation is easy.

What is claimed is:

1. A cutting machine having a mechanism for adjusting a rotational balance of said machine, said cutting machine comprising:

a spindle unit having a rotary spindle, a securing flange mounted on an end of said rotary spindle, said securing flange having a tool-mounting portion along an outer periphery thereof,    an annular cutting tool having a mounting hole that fits to said tool-mounting portion of said securing flange, and    a holding flange for holding said cutting tool in cooperation with said securing flange, wherein:

at least two threaded holes are formed in a radial direction in said outer periphery of one of said holding flange and said securing flange, and balance weight screws are screwed into said threaded holes; and      said balance weight screws are suitably movable forward or back along said threaded holes in said radial direction to adjust the rotational balance of said spindle unit.

2. The cutting machine of claim 1, wherein said threaded holes are formed in said outer periphery of said holding flange.

3. The cutting of claim 1, wherein said threaded holes are formed in said outer periphery of said securing flange.

* * * * *